Patented Dec. 12, 1944

2,364,779

UNITED STATES PATENT OFFICE 2,364,779

SUBRESINOUS ACYLATED POLYAMINE

Melvin De Groote, University City, and Bernhard Keiser, Webster Groves, Mo., assignors to Petrolite Corporation, Ltd., Wilmington, Del., a corporation of Delaware No Drawing. Original application June 27, 1940, Serial No. 342,724. Divided and this application October 4, 1941, Serial No. 413,697

9 Claims. (Cl. 260—404.5)

This application is a division of our pending application Serial No. 342,724, filed June 27, 1940, which subsequently matured as U. S. P. 2,262,358, dated November 11, 1941.

The object of our invention is to provide a new material or composition of matter, that is particularly adapted for use as a demulsifier in the resolution of crude oil emulsions. For instance, the said new material or composition of matter may be used as a break inducer in doctor treatment of the kind intended to sweeten gasoline. See U. S. Patent No. 2,157,223, dated May 9, 1939, to Sutton.

Certain of the compounds which represent different examples of the new composition of matter herein described, are also of value as surface tension depressants in the acidization of calcareous oil-bearing strata by means of strong mineral acid, such as hydrochloric acid. Similarly, some of said compounds are also effective as surface tension depressants or agents in the flooding of exhausted oil-bearing strata.

As to using compounds of the kind herein described as flooding agents for recovering oil from subterranean strata, reference is made to the procedure described in detail in U. S. Patent No. 2,233,382, dated February 25, 1941, to Melvin De Groote and Bernhard Keiser. As to using compounds of the kind herein described as surface tension depressants or demulsifiers, in combination with mineral acid for acidization of oil-bearing strata, reference is made to U. S. Patent No. 2,233,383, dated February 25, 1941, to Melvin De Groote and Bernhard Keiser.

The new composition of matter which constitutes our present invention can be produced by re-acting a polybasic carboxy acid compound containing at least one high molecular weight carboxy acid radical, with a polyamine of the following types:

$$ND_2.T.(T.ND)_x.ND_2$$

$$\overline{\phantom{-}(T.ND)_x.T.ND.T.ND\phantom{-}}$$

in which $x$ is a small whole number less than 10 but including zero, T represents any suitable oxygenated divalent linking radical of the type to be subsequently described; and D may be hydrogen, alkyl, alkylol, hydroxyalkyloxyalkyl, aminoalkyl, RCO, RCO.OX, and RCO.OX', in which RCO is an acyl radical derived from a lower molecular weight carboxy acid having six carbon atoms or less; RCO.OX is a radical in which OX represents a divalent radical obtained at least hypothetically by the removal of a hydroxyl hydrogen atom from an alkylol radical; and RCO.OX' denotes a radical in which OX' represents a radical derived or obtained at least hypothetically by the removal of a hydroxyl hydrogen atom from a hydroxyalkyloxyalkyl radical. Incidentally, as will be subsequently explained, D may represent certain other substituents which will be described hereafter. Said new material or composition of matter has unusual effectiveness as a demulsifier for resolving petroleum emulsions of the water-in-oil type.

Such high molecular weight carboxy acid can be united with a polybasic acid in two general ways: The high molecular weight carboxy acid, usually a monocarboxy acid, may contain an alcoholic hydroxyl group as part of the acyl radical. For instance, ricinoleic acid, hydroxystearic acid, and the like, serve to illustrate this particular type. In other instances, the high molar carboxy acid may be combined with a polyhydric alcohol in such a way that there is available at least one hydroxyl attached to the polyhydric alcohol residue, which may be esterified with or united to the polybasic carboxy acid. Monostearin, mononaphthenin, ethylene glycol monostearate, and the like, illustrate this type. Monoricinolein illustrates a type which includes both varieties of hydroxyl radicals.

In a general way, the most feasible procedure for the manufacture of the compounds of the kind herein contemplated is to combine a polybasic carboxy acid, and particularly, a dibasic acid, such as phthalic acid or anhydride with the selected hydroxylated high molecular weight carboxy acid body, in such a manner as to obtain a material which has at least one free carboxyl radical—in other words, in essence, a fractional ester. Such fractional ester can then be combined with a hydroxylated alkylene diamine of the kind hereinafter described to produce an acylation product, i. e., a product which involves either ester linkages or amide linkages, or both. The expression "fractional ester" is employed in the hereto appended claims to indicate a compound containing at least one free carboxyl radical, attached to a polybasic acid nucleus, and which may or may not contain one or more hydroxyl radicals.

The expression "higher molecular weight carboxy acids" is an expression frequently employed to refer to certain organic acids, particularly monocarboxy acids, having more than 6 carbon atoms and generally less than 40 carbon atoms. The commonest examples include the detergent-forming acids, i. e., those acids which combine with alkalies to produce soap or soap-like bodies. The detergent-forming acids, in turn, include naturally-occurring fatty acids, resin acids, such as abietic acid, naturally-occurring petroleum acids, such as naphthenic acids, and carboxy acids produced by the oxidation of petroleum. As will be subsequently indicated, there are other acids which have somewhat similar characteristics and are derived from somewhat different sources and are different in structure, but can be included in the broad generic term previously indicated.

As to a complete list of suitable high molal acids, reference is made to our aforementioned U. S. Patent No. 2,262,358, page 1, right hand column, line 36, through page 2, left hand column, line 54. It is noted that emphasis is placed on the higher fatty acids, particularly the unsaturated higher fatty acids having 18 carbon atoms, and on the mixtures of higher fatty acids as they appear in naturally-occurring glycerides.

Alkylene polyamines, characterized by the fact that two or more amino nitrogen atoms are joined by an alkylene radical, are well known. Such compounds may be either open chain compounds of the following general formulas:

$$NH_2.C_2H_4.(C_2H_4.NH)_x.NH_2$$

where $x$ is a whole number; or they may be ring compounds having the general formula:

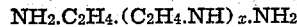

where $x$ is a whole number. The first group is exemplified by diethylene triamine, $$(NH_2.C_2H_4.NH.C_2H_4.NH_2)$$

triethylene tetramine, $$(NH_2.C_2H_4.NH.C_2H_4.NH.C_2H_4.NH_2)$$

and tetraethylene pentamine, $$(NH_2.C_2H_4.NH.C_2H_4.NH.C_2H_4.NH.C_2H_4.NH_2)$$

Examples of the second group are diethylene diamine.

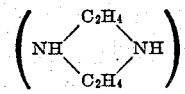

and triethylene triamine:

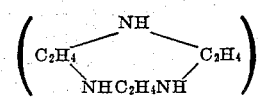

In the above formulas the radical $C_2H_4$ is simply a divalent linking radical. Thus, preceding formulas may be rewritten as follows:

$$NH_2.T.(T.NH)_x.NH_2$$

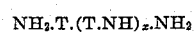

$$(NH_2.T.NH.T.NH_2)$$
$$(NH_2.T.NH.T.NH.T.NH_2)$$
$$(NH_2.T.NH.T.NH.T.NH.T.NH_2)$$

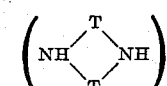

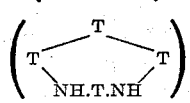

in which T represents any suitable divalent linking radical. If T is an oxygenated divalent linking radical of the kind to be described, and if such polyamines are acylated so as to introduce an acyl radical from a higher molecular weight carboxy acid of the kind previously defined, one obtains a new composition of matter and a compound or a variety of compounds which are particularly effective as demulsifiers for water-in-oil emulsions.

Generally speaking, the oxygenated divalent linking radical is exemplified by three types: the keto type, in which the conventional carbonyl linkage appears; the ether type, in which the conventional ether linkage appears; and the hydroxylated type, in which the conventional alcoholic hydroxyl radical appears. One of the best known examples are compounds obtained from $\beta\beta'$-dichloralkyl ethers, instead of alkylene dichlorides. Such compounds are characterized by the preceding formulas if one adds the proviso that in such formulas T shall represent the divalent radical $CH_2CH_2OCH_2CH_2$. As to the manufacture of such compounds, see U. S. Patent No. 1,919,301, dated July 25, 1933, to Morton. Said patent is concerned largely with compounds containing an aryl radical; but of course, the same procedure is equally effective in connection with ammonia or amines free from an aryl radical and containing at least one reactive hydrogen atom, i. e., the selected amines must be primary or secondary. Furthermore, one is not limited to the ethyl ether halogen derivative; but one may use the propyl ether halogen derivative or other suitable compound. If derived from ammonia, such diamines may be alkylated in the manner commonly employed for alkylating ordinary amines, i. e., monoamines. Alkylation may result in products which are symmetrically or non-symmetrically alkylated. The symmetrically alkylated diamines are most readily obtainable. For instance, alkylated products may be derived by reaction between alkyl chlorides, such as propyl chloride, butyl chloride, amyl chloride, cetyl chloride, and the like. Such reaction products result in the formation of hydrochloric acid, and the resultant product consists of an amine hydrochloride. The conventional method for conversion into the base is to treat with dilute caustic solution. Alkylation is not limited to the introduction of an alkyl group; but, as a matter of fact, a radical may be introduced characterized by the fact that the carbon atom chain is interrupted at least once by an oxygen atom. In other words, alkylation may be accomplished by compounds which are essentially alkyloxyalkyl chlorides, as, for example, the following:

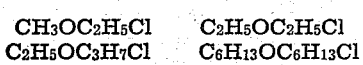

As a matter of common knowledge, reactions involving ammonia and an alkyl ether dichloride probably go through an intermediate stage which involves the formation of amino-alkyl ether halide. As a result, one has another suitable procedure for manufacture of the diamines, i. e., a reaction involving amino alkyl ether halides and a monoamine. See British Patent No. 292,615, to I. G. Farbenindustrie A.-G., application date in the United Kingdom June 22, 1928.

As has been previously stated, the reaction involving the alkyl ether dichlorides is not limited to ammonia, but may involve amines, such as ethylamine, propylamine, butylamine, octylamine, decylamine, cetylamine, dodecylamine, etc. Similarly, the reaction may involve the comparable secondary amines, in which various alkyl radicals previously mentioned appear twice and are types in which two dissimilar radicals appear, for instance, amyl butylamine, hexyl octylamine, etc. Furthermore, compounds may be derived by reactions involving alkylene dichlorides and a mixture of ammonia and amines, or a mixture of two different amines.

It is known that there are numerous other compounds which are akin to the dichloralkyl ethers, in that they are labile or reactive alpha-omega-dichloro derivatives. Thus, well known reactants which supply a divalent linking radical of the kind indicated by T in previous formulas include: dichlorodiethyl ether ($ClC_2H_4OC_2H_4Cl$); chloroethoxy triglycol dichloride; tetraglycol dichloride; dichlorodiisopropyl ether ($ClC_3H_7OC_3H_7Cl$)

dichlorodiisobutyl ether ($ClC_4H_9OC_4H_9Cl$); glycerol dichlorhydrin; methyl glycerol dichlorhydrin; polyglycerol dichlorhydrins; dichloracetone

derived from acetone; dichlormethylpropyl ketone

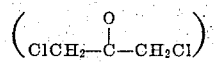

etc.

Various other procedures may be employed for producing polyamines of the kind described. For instance, reference is made to our co-pending application for patent Serial No. 273,278, filed May 12, 1939, which subsequently matured as U. S. Patent No. 2,293,494, dated August 18, 1942. In said application there is described the conversion of triethanolamine into an alcoholate, such as monoalcoholate, by means of caustic soda and the like, and subsequently uniting two moles of such compound by means of a material such as glycerol dichlorhydrin. Similarly, the dialcoholate might be treated in the same manner. Incidentally, such alcoholates may be derived from hydroxyalkyl ethers of tertiaryamines, as well as materials of the kind exemplified by triethanolamine. See U. S. Patent No. 1,923,178, to Ulrich, Nuesslein, and Koerding, dated August 22, 1933.

Other suitable procedure involves hydroxyamines, such as diethanolamine, an aldehyde, particularly formaldehyde, and a ketone, or polyketone having present alphahydrogen atoms. As to such general reactions, see U. S. Patent No. 1,071,007, to Merling, dated August 19, 1913.

In the manufacture of certain diamines and their obvious modifications, which can be made in many instances to yield higher polyamines, i. e., analogous or comparable products having at least three amino nitrogen atoms, generally speaking, if the amine or if ammonia is treated with a reactant having a divalent linking radical and two labile halogen atoms, such as chlorine atoms, one is apt to obtain varying amounts of such higher polyamines. For the sake of brevity, further indications will be limited to procedures for making various suitable polyamines. Such suitable polyamines will be the following:

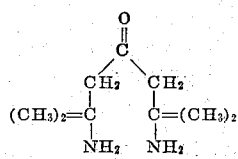

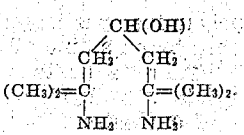

(See German Patent No. 96,657, March 1, 1898.)

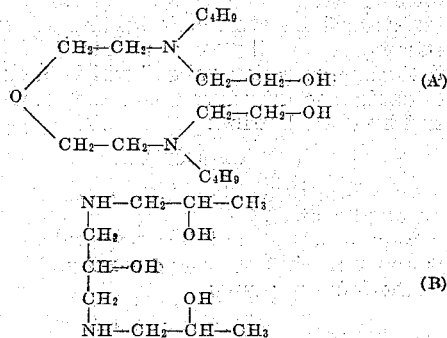

(See German Patent No. 635,904, to I. G. Farbenindustrie, A.-G., dated October 1, 1936.)

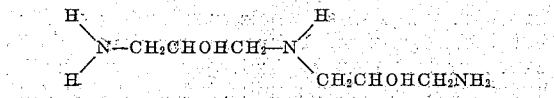

N-(2-hydroxy-3-aminopropyl)-2-hydroxy propylene diamine-1,3.

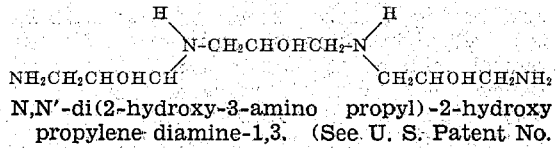

N,N'-di(2-hydroxy-3-amino propyl)-2-hydroxy propylene diamine-1,3. (See U. S. Patent No. 2,046,720, to Bottoms, dated July 7, 1936.)

See also U. S. Patent No. 2,132,074, to Kartaschoff and Aeschlimann, dated October 4, 1938.

Among products commercially available is, 1,3-diamino-2-propanol, which is an especially suitable reactant.

It has been pointed out that polyamines of the kind previously described may be produced or reacted in such a manner that the amino hydrogen atom is replaced by an alkyl radical, a hydroxyalkyl radical, a hydroxyalkyloxyalkyl radical, or the like. It is well known that certain other modifications can be obtained by conventional procedure. For instance, one may introduce acyl radicals derived from acids having 6 carbon atoms or less, such as acetic acid, butyric acid, and the like. Such products are obtained by treatment with acetic anhydride, acetyl chloride, or equivalent reactants. Furthermore, it is known that one can obtain derivatives of amines of the kind described by reactions with chlorhydrins derived from polyglycols, polyglycerols and the like, such as diglycerol chlorhydrin, the chlorhydrin derived from the dihydric alcohol obtained by etherizing two moles of diethylene glycol, etc. Similarly, amino hydrogens may be substituted by reaction with compounds of the kind typified by ethyl chloracetate, i. e., esters of carboxy acids in which an alpha-hydrogen has been substituted by chlorine. Similarly, as has been suggested previously, amino alkyl chlorides may be employed so as to introduce an amino alkyl group. As an example of such amino alkyl halide, reference is made to the description of certain examples found in U. S. Patent No. 2,014,077, dated September 10, 1935, to Wilson. Furthermore, in certain instances polyamines such as diamines may be employed. Certain other compounds may be looked upon as instances in which one of the amino hydrogen atoms of a polyamine, particularly a diamine, has been replaced by an amino alkyl group. For the sake of brevity, in the hereto appended claims the expression "alkyloxyalkyl" is intended to include the type of oxyhydrocarbon radical where the hydrocarbon chain is interrupted more than once by an oxygen atom. Similarly, since materials such as ethyl chloracetate are sometimes spoken of as alkylating agents, it is intended that the expression "alkyl" will include the type of radical so introduced, i. e., a radical exemplified by the following:

CH2COOC2H5 although, strictly speaking, it is not, of course, an alkyl radical.

Summarizing what has been said thus far, it is apparent that one could readily obtain amines of the following type:

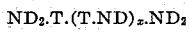
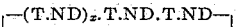

in which $x$ is a small whole number less than 10 but including zero, T has its previous significance and D may be hydrogen, alkyl, alkylol, hydroxyalkyloxyalkyl, aminoalkyl, RCO, RCO.OX, and RCO.OX', in which RCO is an acyl radical derived from a lower molecular weight carboxy acid having 6 carbon atoms or less; RCO.OX is a radical in which OX represents a divalent radical obtained at least hypothetically by the removal of a hydroxyl hydrogen atom from an alkylol radical; and RCO.OX' denotes a radical in which OX' represents a radical derived, at least hypothetically, by the removal of a hydroxyl hydrogen atom from a hydroxyalkyloxyalkyl radical. If one adds the proviso that there must be a reactive hydrogen atom present in such polyamine, i. e., a hydrogen atom linked to a nitrogen atom or to an oxygen atom, one then has an acylation-reactive polyamine.

In other words, such polyamine can be acylated so as to introduce a polybasic carboxy acid acyl group in the same manner that any other amine can be acylated, i. e., an ordinary monoamine or diamine. Thus, the methods for acylating ordinary monoamines which are primary or secondary are well known. Likewise, suitable procedure for acylating diamines, including hydroxylated diamines, is well known. In the present instance, as a variation, one employs a suitable polybasic acid or any functional equivalent. For convenience, amines of the above type which can be acylated, i. e., have present a reactive hydrogen atom, will be referred to as acylation-reactive amines. Such acylation products may be of the amide type, in other words, of a type in which the acyl group is directly attached to the amino nitrogen atom; or they may be of the ester type, where the acyl group replaces a hydroxyl hydrogen atom, and thus is linked to a nitrogen atom through a carbon chain; or the acylation derivative may exemplify both types where the amine employed as a raw material has present at least one amino hydrogen atom and at least one hydroxyl hydrogen atom. As has been previously stated, it is unnecessary to describe to any length the method of producing the acylation products, except to indicate that the same means may be employed as in connection with the acylation of any ordinary amine, whether a monoamine or a diamine, although the employment of a polybasic compound may be considered as a variation.

It is understood that the new composition of matter herein contemplated, and particularly, for use as a demulsifier, may be prepared in any suitable manner. As has been stated, it is our preference to obtain an acylation-reactive amine of the type or kind just described, and react the same with a polybasic carboxy acid compound or its functional equivalent. It is our preference to use the type of polybasic acid compound which is characterized by the presence of an acyl radical of the detergent-forming acid type, which includes fatty acids, resin acids, and petroleum acids. Such petroleum acids may be naturally-occurring acids, such as naphthenic acid, or may be obtained by the oxidation of paraffin or the like. Of the various detergent-forming acids which may be employed to supply the detergent acid type acyl radical, we prefer to use fatty acids, and most particularly, hydroxylated fatty acids, such as ricinoleic acid.

Previous reference has been made to the introduction of an aminoalkyl radical in place of an amino hydrogen atom. The availability of a compound of the following types:

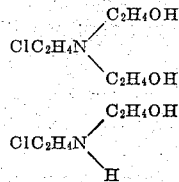

would permit the introduction of a hydroxyalkylamino radical. However, the introduction of such type radical is more feasible by introducing an aminoalkyl radical from a compound such as, for instance, chloramylamine

The use of such halide permits the introduction of the aminoalkyl radical NH2.C5H10. Such radical, after being introduced into the polyamine nucleus, whether prior to or after acylation, can, of course, be treated with an oxyalkylating agent, such as ethylene oxide, or any similar α β alkylene oxide or with glycid, epichlorhydrin and other reagents, so as to convert one or both of the amino hydrogen atoms in the above described aminoalkyl radical into a hydroxyalkyl radical, or, in the case of ethylene oxide, into a C2H4OH radical. Needless to say, such a radical, which is, in essence, an alkylolamine radical or an alkylolamine residue, can be acylated by acids of low molecular weight, in the same manner that has been described previously in regard to any alcoholic hydroxyl which happens to be present.

Summarizing what has been said, it is obvious that the polyamine of the kind described can be characterized by the following formulas:

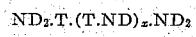
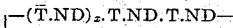

in which $x$ is a small whole number including 0, but in any event, less than 10, and preferably 1 to 4; T is an oxyhydrocarbon radical selected from the class consisting of the keto type, the ether type, and the alcohol type; and D is hydrogen, alkyl, alkylol, hydroxyalkyloxyalkyl, aminoalkyl, hydroxyalkylamino, R C O, R C O O X, RCOOX', RCOOX'', RCOOX'''; RCO is an acyl radical derived from a lower molecular weight carboxy acid having 6 carbon atoms or less; OX represents a divalent radical obtained at least hypothetically by removal of a hydroxyl hydrogen atom from an alkylol radical; OX' represents a radical derived at least hypothetically by removal of a hydroxyl hydrogen atom from a hydroxyalkyloxyalkyl radical; OX'' represents a divalent radical derived at least hypothetically by the removal of an amino hydrogen atom from an aminoalkyl radical; and OX''' represents a radical derived at least hypothetically by removal of a hydrogen atom from a hydroxyalkylamino radical.

Attention is directed to the fact that the word "amidification" has been applied to the reaction involving the replacement of an amino hydrogen atom by an acyl radical, without conventional limitation to a reaction involving ammonia. The replacement of the amino hydrogen atom of a primary amine or a secondary amine by an acyl radical has been considered as being amidification, rather than the formation of a substituted amide, or the formation of an imide or substituted imide. Such obvious departure from conventional nomenclatures has been for purposes of simplicity and to show the similarity between certain reactions.

It is to be understood that the compound herein contemplated may be manufactured in any suitable manner; and one is not dependent upon following the exact procedure previously outlined. In certain instances the other reactants might be employed, or else reactants of the kind previously described might be combined in some other manner.

The polybasic acids which may be employed, including some having at least three carboxyl radicals, are phthalic, succinic, malic, fumaric, citric, maleic, adipic, tartaric, glutaric, diphenic, naphthalic, oxalic, tricarballylic, etc. Instead of the acids themselves, one may use any suitable functional equivalent, and particularly, the anhydrides. We prefer to use oxalic acid, maleic acid, and phthalic acid. In the use of maleic acid and phthalic acid, we particularly prefer to use the anhydride, i. e., maleic anhydride and phthalic anhydride. It is understood that in the hereto attached claims any references to the acid or the anhydride is intended to be interchangeable.

The manufacture of fractional esters, characterized by having present: (a) a detergent-forming acid radical; and (b) a free carboxyl radical directly attached to a polybasic acid residue, is well known. Such materials have found utility in various arts. The same procedure which is employed in connection with the detergent-forming acids would apply to any of the high molecular weight carboxy acids previously described, and particularly, those which are primarily monocarboxy in nature.

Likewise, the procedure followed in respect to the detergent-forming acids is best exemplified by the fatty acids, although obviously, the same procedure is equally suitable for resin acids and petroleum acids, whether naturally-occurring or obtained by the oxidation of paraffin or the like.

In order to eliminate lengthy detailed description of these particular materials, which are well known compositions of matter, reference is made to U. S. Patent No. 2,166,431, dated July 18, 1939, to Melvin De Groote, and particularly, to the subject-matter which appears on page 4, right hand column, line 36, through page 5, right hand column, line 16; and also to U. S. Patent No. 2,166,433, dated July 18, 1939, to Melvin De Groote, beginning on page 4, right hand column, line 39, through page 6, right hand column, line 62.

In subsequent examples reference will be made to the manufacture of our new composition of matter by reacting a polybasic acid derivative of a detergent-forming acid compound, or, for that matter, a derivative of any high molecular weight carboxy acid, with a hydroxylated polyalkylene diamine of the kind previously described. It is understood, however, that the composition of matter could be obtained in any suitable manner, and that in the hereto attached claims it is not intended that there shall be any limitation as to the procedure employed. For instance, one might first combine the selected amine with a polybasic carboxy acid by means of an acylation reaction in such a manner as to have present a free carboxyl radical attached to the polybasic carboxy acid. Such product then might be esterified with a hydroxylated detergent-forming acid body or the like, for instance, triricinolein, to give a compound of the kind herein contemplated. We find, however, that the most feasible procedure is to employ the method previously suggested, although, as has been remarked, it is not intended in any manner to be a limitation in regard to the nature of the composition of matter herein contemplated.

It is understood that the compounds of the kind herein contemplated may contain acyl radicals derived from polybasic carboxy acids and not united to the amine residue. For instance, diphthalated castor oil could be reacted with the selected amine in such a manner that only one phthalic acid radical is united with the amine. The other phthalic acid radical may remain in the acidic state, or the carboxy hydrogen atom could be replaced in any suitable manner, as described. Furthermore, if a tribasic acid is employed, such as citric acid, then two carboxy radicals might be employed to unite the carboxy detergent-forming residue or the like with the amine residue, and the remaining carboxy radical could remain as such, i. e., in the acid state; or again, it might be so treated that the acidic hydrogen atom is replaced in the manner subsequently described.

Thus, in the manufacture of various compositions of matter of the kind herein contemplated, it is to be understood that any residual carboxylic hydrogen atoms derived from polybasic carboxy acids may remain as such, or may be replaced by any suitable equivalent, such as metal, or a hydrocarbon radical, or an amine residue. In other words, one is not limited to the use of a polybasic carboxy acid; but one might employ some suitable form in which one carboxylic hydrogen atom had already been replaced in a manner above described. For instance, one might use sodium hydrogen phthalate, potassium hydrogen phthalate, sodium hydrogen maleate, potassium hydrogen maleate, octyl hydrogen phthalate, cetyl hydrogen maleate, ethyl hydrogen phthalate, or the like, in place of the polybasic carboxy acids themselves. Polybasic acids having more than two carboxyls may have two such substituents, such as disodium citrate.

Similarly, the acidic material containing a free carboxyl radical may be neutralized with a suitable base, esterified with a suitable alcohol, particularly, an aliphatic alcohol, such as ethyl, methyl, propyl, butyl, or octyl alcohol; or one may eliminate the acidic hydrogen carboxyl if present by an amine, so as to form a substituted ammonium salt; or if the amine is hydroxylated, as in the case of triethanolamine, one may form an ester in which the amine supplies the alkyl radical. However, where only one mole of a dibasic acid is employed for each mole of higher molal carboxy acid, then both carboxyl radicals are involved in the reactions, without a residual carboxyl hydrogen atom being present.

In the preferred type of material, we employ a compound, in which, as has been previously indicated, a carboxyl group of the polybasic carboxy acid has been caused to unit with a hydroxylated detergent-forming acid body. As has been previously noted, the detergent acids include fatty acids, particularly the higher fatty acids, resin acids, petroleum acids, such as naturally-occurring petroleum acids, and also petroleum acids obtained by the oxidation of paraffin hydrocarbons or the like. For the sake of brevity, reference will be made to phthalic anhydride. One mole of phthalic anhydride may be esterified with a mole of ricinoleic acid, diricinoleic acid, polyricinoleic acid, chlororicinoleic acid, or the like. Similarly, one might employ an ester, such as ethyl ricinoleate, propyl ricinoleate, butyl ricinoleate, octyl ricinoleate, benzyl ricinoleate, cyclohexyl ricinoleate, etc.

Another procedure would be to employ one or two moles of the phthalic anhydride and the ester of a dihydric alcohol, such as ethylene glycol diricinolein, propylene glycol diricinolein, etc. Similar derivatives may be obtained from hydroxystearic acid or polyhydroxylated stearic acids of the kind described in U. S. Patent No. 1,835,203, dated December 2, 1931, to Bruson. Similarly, one may employ the esters of glycerine, such as triricinolein, trihydroxystearin, etc.

Instead of depending upon the hydroxyl group as being part of the acyl radical, one may, as previously suggested, employ compounds in which the hydroxyl radical is part of the polyhydric alcohol residue. Thus, one might employ monostearin, mono-olein, mononaphthenin, monoabietin, or similar compounds obtained from oxidized petroleum acids. One can also employ the type of materials in which there are two acyl groups attached to the polyhydric alcohol residues, for instance, distearin, di-olein, dinaphthenin, etc. Similar hydroxylated compounds can be derived from the various glycols, from materials such as sorbitol, mannitol, sorbitan, mannitan, pentaerythritol, diglycerol, triglycerol, polyglycerol, diglycerol, diglycols, etc. Similarly, one may obtain materials of the kind in which there is at least one hydroxyl radical present as part of the acyl group, and at least, one hydroxyl radical present as part of the polyhydric alcohol residue, as, for example, monoricinolein, diricinolein, monohydroxystearin, dihydroxystearin, the ricinolein mono-ester of ethylene glycol, or similar glycols, etc.

The following are examples of the new composition of matter that constitutes one feature of our present invention, and which is adapted to be used as a demulsifier in practising our process for resolving petroleum emulsions:

*Composition of matter, Example 1*

An amine of the following type:

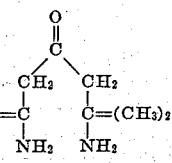

previously described is acylated with a molar proportion of triricinolein monophthalate. The product so obtained is entirely of the amide type.

*Composition of matter, Example 2*

The same procedure is followed as in the preceding example, except that an amine of the following type is employed.

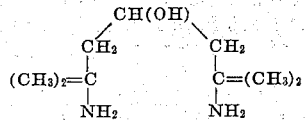

The material so obtained is largely the ester type, although there is present some of the amide type, and also some of the amide-ester type.

*Composition of matter, Example 3*

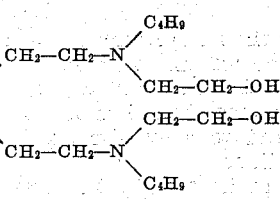

is employed following the same procedure as in Composition of matter, Example 1. The acylated product so obtained is entirely of the ester type.

*Composition of matter, Example 4*

An amine of the following type:

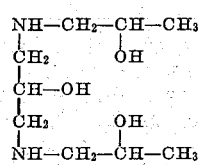

is employed, and one employs the same procedure as in Composition of matter, Example 1.

*Composition of matter, Example 5*

The same procedure is employed as in Composition of matter, Example 1, except that one employs either one of the following two amines or a mixture thereof: N-(2-hydroxy-3-aminopropyl)-2-hydroxy propylene diamine-1,3; N,N'-di(2-hydroxy-3-amino propyl)-2-hydroxy propylene diamine-1,3.

*Composition of matter, Example 6*

1,3-diamino-2-propanol is acylated with triricinolein monophthalate.

*Composition of matter, Example 7*

In all the preceding examples there are at least two, and usually more than 2, reactive hydrogen atoms. Thus, the procedure of the preceding 6 examples is repeated by employing two moles of monophthalated triricinolein for each mole of amine.

*Composition of matter, Example 8*

The same procedure is employed as in the preceding 7 examples, except that triricinolein diphthalate is employed.

*Composition of matter, Example 9*

The same procedure is followed as in the previous examples, except that mono-olein monophthalate is employed in place of triricinolein monophthalate.

Composition of matter, Example 10

The same procedure is followed as in Composition of matter, Example 8, preceding, except that mono-olein diphthalate is substituted for triricinolein diphthalate.

Composition of matter, Example 11

Monoabietin monophthalate, monoabietin diphthalate, mononaphthenin monophthalate, and mononaphthenin diphthalate are substituted in the previous examples, the monophthalated product replacing triricinolein monophthalate, and the diphthalated products replacing triricinolein monophthalate.

Composition of matter, Example 12

One follows the preceding example, except that the anologous maleated product derived from maleic anhydride instead of phthalic anhydride is employed.

An examination of what has been said previously in regard to the manufacture of the composition of matter herein contemplated, reveals the fact that the diamines of the type described invariably contain at least one reactive hydrogen atom, and may contain more than one, and in fact, usually do contain more than one.

Reactive hydrogen atoms, of course, refer to such hydrogen atoms, directly linked to nitrogen or oxygen; i. e., to hydroxyl hydrogen atoms, or amino hydrogen atoms. The acyl group derived from a polybasic carboxy acid may be introduced in either position, i. e., as a substituent for either or both types of reactive hydrogen atoms. When such group enters an amino hydrogen atom, it forms an amide. When it enters a hydroxy hydrogen atom position, it forms an ester. Under vigorous conditions of amidification one might obtain secondary amides. One can readily obtain the types in which there is both the amide linkage and the ester linkage. If desired, one may have present an acyl group derived from a lower molecular weight acid, i. e., one having 6 carbon atoms or less; for instance, acetic acid, propionic acid, butyric acid, or the like. The presence of such acyl radical is not intended to represent anything more than the equivalent of the presence of an alkyl radical.

In general, all the acylation reactions of the kind described take place readily by reactions involving the selected materials in such a manner that any water which is formed is eliminated. Acylation can be accompanied by the elimination of some other compound, such as $NH_3$ or $HCl$. Usually, this means employment of a temperature above 120° C. and below the point of decomposition. Generally, a temperature of 140–180° C. is most suitable. A dry, inert gas may be passed through the mass during reaction to hasten acylation. It is understood, of course, that such acylation reactions do not include salt formation. In other words, if the intermediate raw material is of the basic type, it can form a salt with an acid such as citric acid or phthalic acid. On heating such salt, acylation products are obtained.

Since at times there is some confusion as to the use of the word "acyl" or the like in connection with polybasic acids, insofar that there is more than one carboxy hydroxyl group present, it is deemed desirable specifically to point out that the word "acyl" or its equivalent is used in the present instance to mean the removal of one or more carboxy hydroxyl groups, without limitation as to the nature of any carboxyl groups that may remain, i. e., without limitation as to being in the acidic state or neutralized state. This may be illustrated in the following manner:

If a polybasic acid be indicated by the following formula:

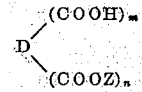

in which D represents a polybasic acid residue, $m$ and $n$ represent small whole numbers, including zero, and usually not over three, with the proviso that $m$ plus $n$ must be at least 2, and Z represents any metal, ammonium radical, substituted ammonium radical, or monovalent organic radical which replaces a carboxylic hydrogen, then examples of acyl radicals derived from such polybasic carboxy acids include the following types:

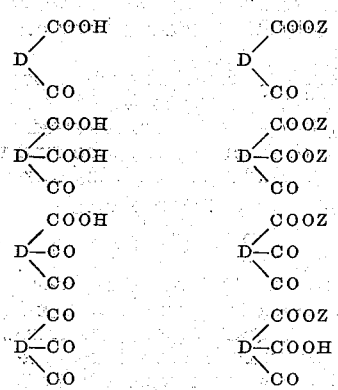

The word "phthalyl" will be given the corresponding breadth of definition.

In such instances where the amine contains at least two hydroxyl radicals, or at least two amino hydrogen atoms, or at least one hydroxyl radical and at least one amino hydrogen atom, then one is dealing with a polyfunctional or bifunctional compound; and thus reactions involving such types of compounds with a polybasic acid or dibasic acid, such as phthalic anhydride, will produce a sub-resinous or semi-resinous type of material. Compare analogous reactions involving glycerol or glycol or monoethanolamine with dibasic or polybasic acids. However, diphthalated triricinolein, as any similar polycarboxy derivative will act in the same manner as phthalic anhydride. Our preferred reagent is derived from an amine which is polyfunctional and is most desirably of the sub-resinous type, although it may be a monomer, dimer, or trimer. In other words, it is preferably a compound or a mixture of compounds which still represents a liquid or plastic or fusible mass at a temperature in which the final reaction is completed and is soluble in one or more solvents which may be hydrophobe or hydrophile in nature, including solutions of such acids as acetic acid, hydrochloric acid, etc. Polymers may represent repeated monomers with elimination of water or the like.

Certain obvious functional equivalents suggest themselves and need not be described in detail. For instance, a halogenated ricinoleic acid body might be employed just as advantageously as an ordinary ricinoleic acid body. No advantage would be obtained by the use of more expensive raw material. Similarly, chlorinated phthalic anhydride or acid might be used in place of the less expensive raw material.

It is to be noted that the expression "alkyloxyalkyl" is used in the hereto appended claims to indicate a radical in which the carbon atom chain is interrupted at least once by oxygen and might be interrupted more than once, for instance, if derived from a compound obtained by the etherification of two moles of diethylene glycol.

In the hereto appended claims, the expression "alkylol" is not intended to be limited to monohydroxy alkyl radicals, but is intended to include polyhydroxylated alkyl radicals.

It is to be noted that some of the compounds described are basic in character, due to the presence of an unacylated basic amino nitrogen atom, or due to the presence of an esterified group of the kind described. In such instances the compound may be employed as such, or may be employed in basic form (i. e., after combination with water), or may be employed in salt form by reaction with an acid, such as acetic acid, lactic acid, hydrochloric acid, or any other suitable acid.

Summarizing, then, what has been said, it will be appreciated that the present composition of matter may be characterized as acylated derivatives of a polyamine of the kind which can be characterized by the following formulas:

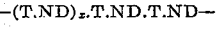

in which $x$ is a small whole number including 0, but in any event less than 10, and preferably 1 to 4; T is an oxyhydrocarbon radical selected from the class consisting of the keto type, the ether type, and the alcohol type, and D is hydrogen, alkyl, alkylol, hydroxyalkyloxyalkyl, aminoalkyl, hydroxyalkylamino, RCO, RCO.OX, RCO.OX', RCO.OX'', and RCO.OX'''; in which RCO is an acyl radical derived from a lower molecular weight carboxy acid having 6 carbon atoms or less; OX represents a divalent radical obtained at least hypothetically by removal of a hydroxyl hydrogen atom from an alkylol radical; OX' represents a radical derived at least hypothetically by removal of a hydroxyl hydrogen atom from a hydroxyalkyloxyalkyl radical; OX'' represents a divalent radical derived at least hypothetically by the removal of an amino hydrogen atom from an aminoalkyl radical; and OX''' represents a radical derived at least hypothetically by removal of a hydrogen atom from a hydroxyalkylamino radical.

As has been previously stated, the expression "alkyl" is intended at all times, particularly in the claims, to include products of the kind derived from ethyl chloracetate or the like; and the expression "alkyloxyalkyl" is intended similarly to include products in which the carbon atom chain is interrupted more than once by oxygen. This last statement is intended particularly to apply in respect to the hereto attached claims.

In the hereto appended claims, reference to a "high molecular weight carboxy acid residue"; "a detergent-forming acid residue"; "a fatty acid residue," or "a ricinoleic acid residue" are intended to refer to the residue or radical derived not only from the fatty acid, but also from an ester by dehydroxylation. In other words, it is not limited to a residue obtained by dehydroxylation of hydroxy naphthenic acid, hydroxy abietic acid, or ricinoleic acid, but is intended to include residues obtained by dehydroxylation of the esters, such as the dehydroxylation of triricinolein, monostearin, distearin, mononaphthenin, dinaphthenin, monoabietin, diabietin, and similar esters derived from the glycols and characterized by the presence of an alcoholic hydroxyl as part of the polyhydric alcohol radical.

It is to be noted that some of the compounds described are basic in character, due to the presence of an unacylated basic amino nitrogen atom, or due to the presence of an esterified group of the kind described. In such instances the compound may be employed as such, or may be employed in basic form (i. e., after combination with water), or may be employed in salt form by reaction with an acid such as acetic acid, lactic acid, hydrochloric acid, or any other suitable acid.

Having thus described our invention, what we claim as new and desire to secure by Letters Patent is:

1. A sub-resinous acylation derivative of a polyamine of the following formula:

in which $x$ is a small numeral varying from 0 to 5; T is an oxyhydrocarbon radical selected from the class consisting of ketone, ether and alcohol radicals; and D is a member of the class consisting of hydrogen atoms and alkyl, alkylol, hydroxyalkyl, oxyalkyl, and hydroxyalkylamino radicals, the acyl group substituted for a reactive hydrogen atom of said polyamine being the acyl radical of an acidic fractional ester residue, which fractional ester in turn is characterized by the presence of:

(a) At least one detergent-forming monocarboxy acid radical; and
(b) At least one polybasic carboxy acid radical;

and said acylation derivative being additionally characterized by the fact that there is at least one polybasic carboxy acid radical acting as a linking radical between the amine residue and a detergent-forming monocarboxy acid residue; said detergent-forming monocarboxy acid residue having at least 9 carbon atoms and not more than 32 carbon atoms, and said polybasic carboxy acid radical having not over 8 carbon atoms.

2. The acylation derivative described in claim 1, wherein the detergent-forming monocarboxy acid radical is that of a higher fatty acid.

3. The acylation derivative described in claim 1, wherein the detergent-forming monocarboxy acid radical is that of a higher unsaturated fatty acid.

4. The acylation derivative described in claim 1, wherein the detergent-forming monocarboxy acid radical is that of a higher unsaturated fatty acid having 18 carbon atoms.

5. The acylation derivative described in claim 1, wherein the detergent-forming monocarboxy acid radical is that of a higher unsaturated fatty acid having 18 carbon atoms and the polycarboxy acid radical is a dicarboxy acid radical.

6. The acylation derivative described in claim 1, wherein the detergent-forming monocarboxy acid radical is a ricinoleyl radical and the polybasic carboxy acid radical is a dicarboxy acid radical.

7. The acylation derivative described in claim 1, wherein the detergent-forming monocarboxy acid radical is a ricinoleyl radical and the polybasic carboxy acid radical is a phthalic acid radical.

8. The acylation derivative described in claim 1, wherein the detergent-forming monocarboxy acid radical is a ricinoleyl radical and the polybasic carboxy acid radical is a maleic acid radical.

9. The acylation derivative described in claim 1, wherein the detergent-forming monocarboxy acid radical is a ricinoleyl radical and the polybasic carboxy acid radical is an adipic acid radical.

MELVIN DE GROOTE.
BERNHARD KEISER.